Figure 1:
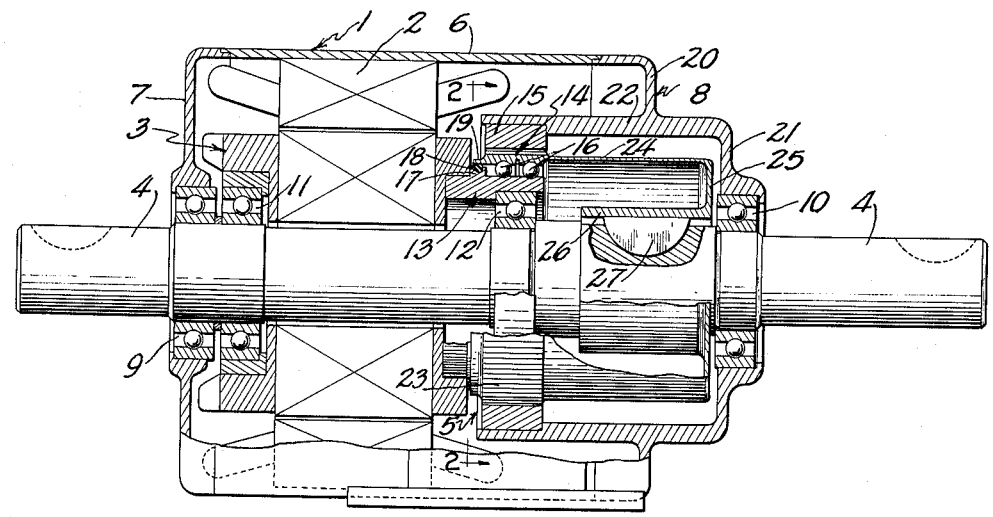

March 8, 1966  F. F. FERRARY  3,239,699

ELECTRICAL MOTORS

Original Filed May 11, 1959

INVENTOR.
FERDINAND F. FERRARY
BY
*D.C.Loylance*
ATTORNEY

United States Patent Office 3,239,699
Patented Mar. 8, 1966

3,239,699
ELECTRICAL MOTORS
Ferdinand F. Ferrary, Springdale, Conn., assignor to American Machine & Foundry Company, a corporation of New Jersey
Continuation of application Ser. No. 812,515, May 11, 1959. This application Apr. 26, 1963, Ser. No. 278,511
8 Claims. (Cl. 310—83)

This invention relates to motors and particularly to electrical motors embodying speed change drive means contained within the motor housing.

This application is a continuation of an earlier application, Serial No. 812,515, filed May 11, 1959, and now abandoned.

For reasons of compactness and economy, prior-art workers in the electrical motor art have endeavored to devise an electrical motor wherein a satisfactory speed reduction or other type of gearing is provided within the motor housing. In many instances, attempts have been made to combine the gearing in a motor wherein the rotor is fixed to the drive shaft, but such attempts have frequently not been entirely successful because of the necessity for increasing the axial length of the motor by a substantial amount to accommodate not only the gearing but also a second shaft driven via the gearing. To overcome this disadvantage, it has been proposed to design the motor with a hollow rotor and to mount the drive shaft in such fashion that it extends completely through the rotor. However, motors of this type have also not been entirely satisfactory because of the difficulties encountered in providing a satisfactory compact gear mechanism interconnecting the rotor and drive shaft.

An object of the present invention is to provide an improved, highly simplified, electrical motor wherein speed change means is enclosed within the motor housing.

Another object is to devise such a motor wherein provision of the speed change means within the motor housing is accomplished with only minor changes in the housing design, and with a minimum axial elongation of the unit as a whole, as compared to a motor with no combined speed change mechanism.

A further object is to provide a hollow rotor electrical motor having a drive shaft extending within the rotor and embodying a novel speed change mechanism interconnecting the rotor and drive shaft.

Yet another object is to devise such a hollow rotor motor wherein the rotor is supported on the drive shaft by bearings which are identical with those which support the shaft on the motor housing.

A still further object is to devise an electrical motor embodying a speed reduction drive contained within the motor housing and wherein no partitions, complex mounting plates or like elements need be provided within the housing to accommodate the speed reduction drive.

Figure 2:
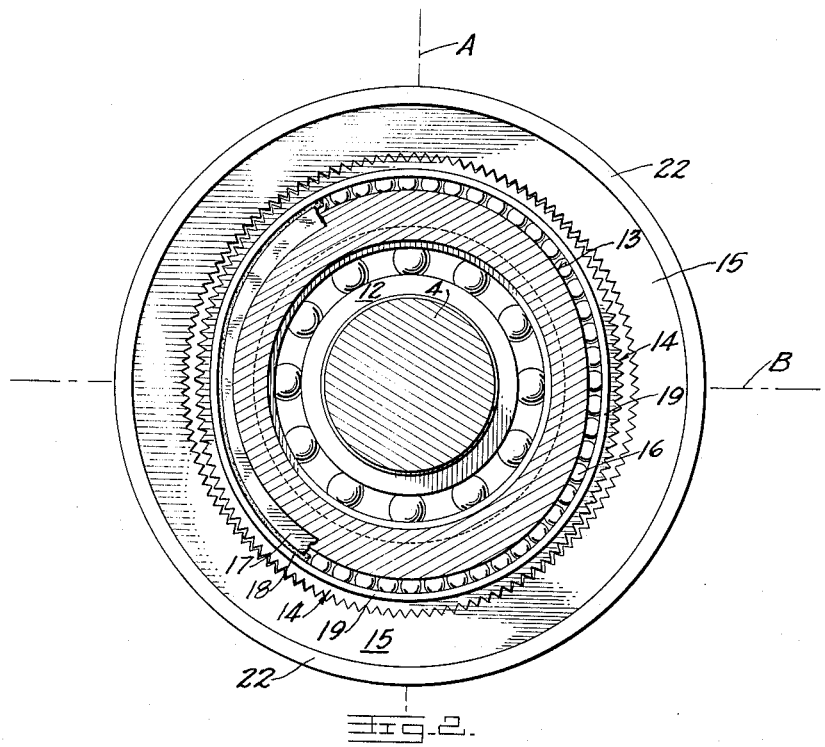

In order that the manner in which these and other objects are accomplished in accordance with the invention can be understood in detail, reference is had to the accompanying drawings, which form a part of this specification, and wherein:

FIG. 1 is a longitudinal sectional view of a motor constructed in accordance with one embodiment of the invention, some parts being shown in partial side elevation, and FIG. 2 is a transverse sectional view taken on line 2—2, FIG. 1.

Referring now to the drawings in detail, it will be seen that the embodiment of the invention here illustrated comprises a housing indicated generally at 1, a stator 2 fixed to the housing, a hollow rotor 3, a drive shaft 4 extending through the rotor, and a speed reduction device, indicated generally at 5, interconnecting the rotor and the shaft.

Housing 1 includes a cylindrical main body portion 6 and end bells 7 and 8 connected thereto in any suitable fashion, each end bell being provided with a central opening through which the drive shaft extends. In such opening in end bell 7, there is mounted an anti-friction rotary bearing 9, which may be a conventional ball bearing or of any suitable type. An identical bearing 10 is mounted in the central opening in end bell 8, shaft 4 being journaled in bearings 9 and 10 and thereby rotatably mounted on the housing.

At its ends, the hollow rotor 3 carries anti-friction rotary bearings 11 and 12, which bearings mount the rotor on shaft 4 for rotation about the axis thereof. Bearings 11 and 12 can be similar to bearings 9 and 10.

Electrically, the stator 2 and rotor 3 are of conventional construction, the rotor being operatively disposed coaxially within the stator in a manner well known in the electrical motor art.

Bearing 11 is simply seated in a cylindrical recess in the main body portion of the rotor structure. At its end adjacent end bell 8, rotor 3 is provided with a cylindrical recess in which is seated a generally cylindrical member 13, the member 13 being rigidly attached to the rotor. At its outer end, member 13 has a plain cylindrical inner surface which embraces bearing 12.

The speed reduction means 5 is of the strain wave type described, for example, in U.S. Patent 2,883,150, issued April 21, 1959, to C. Walton Musser, and embodies an inner wave generator, which, as will be described, is formed in part by member 13, an externally toothed, deformable output member 14, and a circular, internally toothed, rigid, stationary member 15.

While the portion of member 13 disposed within the cooperating recess in rotor 3 has a plain cylindrical outer surface, the outer wall of the remainder of member 13 is of elliptical transverse cross-section, as will be seen in FIG. 2, the major axis of the ellipse being indicated at A and the minor axis at B. The tip portion of member 13 acts as the inner race of a ball bearing, deformable member 14 acting as the outer race. As seen in FIG. 1, two series of balls 16 are provided between members 13 and 14, and the members 13 and 14 are appropriately grooved to provide retaining raceways for the balls, each groove extending elliptically, as will be clear from FIG. 2.

Adjacent rotor 3, member 13 is provided with an annular, outwardly projecting flange 17 having a peripheral groove in which is seated a sealing ring 18 of any suitable type. One end portion 19 of member 14 embraces the sealing ring, as shown in FIG. 1.

End bell 8 includes an outer annular transverse portion 20, an inner annular transverse portion 21 and a cylindrical portion 22 coaxial with shaft 4. Portion 21 is spaced axially outwardly of portion 20, and cylindrical portion 22 extends from portion 21 inwardly beyond portion 20, terminating in a free tip portion disposed adjacent rotor 3 and in which is fixedly mounted the outer element 15 of speed reduction means 5.

Member 14 includes the exteriorly-toothed portion 23 and, extending axially therefrom within cylindrical portion 22 of end bell 8, a thin-walled tubular portion 24. Adjacent bearing 10, portion 24 terminates in an end wall 25 which is somewhat thicker than portion 24 and which lies transversely of shaft 4. End wall 25 extends inwardly to a sleeve 26 which embraces shaft 4 and extends inwardly therealong. Sleeve 26 has a relatively thick wall and is keyed to shaft 4 at 27 in conventional manner.

The teeth provided on members 14 and 15 can be of any conventional shape and extend axially of the assembly, more teeth being provided on member 15 than on member 14. Member 15 extends as a conventional ring gear. However, since toothed portion 23 of member 14 is held in elliptical shape by the wave generator constituted by member 13 and balls 16, the teeth on member 14 engage with the teeth on member 15 only at two points. Thus, the teeth mesh at the ends of the major axis A of the ellipse but are otherwise held out of engagement.

As rotor 3 turns during operation of the electrical motor, the elliptical tip of member 13 also turns. Hence, the points of engagement between members 14 and 15 progress, portions 23 and 24 of member 14 continually flexing to allow such action.

For each rotation of member 13, member 14, and hence shaft 4, are turned through an angular distance equal to the tooth differential between members 14 and 15.

While, in this form of the strain wave type speed reducer, the teeth on the deflectable output member 14 and the fixed member 15 engage at only two diametrically opposite points, more than two such points of engagement can be employed, so long as such points are spaced equally circumferentially about toothed portion 23. The tooth differential between members 14 and 15 is made equal to or a multiple of the number of points at which the two sets of teeth are held in mesh by the strain wave generator. Hence, the ratio of speed reduction can be predetermined by the shape of the outer surface of the tip of member 13 and by the number of teeth on the gear members Members 13 and 15 can be fabricated of any material of suitable rigidity. Member 14 must be capable of continual radial flexing during operation of the motor, but must also have sufficient strength to transmit rotary motion from the rotor to the drive shaft. Accordingly, the length of portion 24 is relatively great as compared to the axial dimension of toothed portion 23.

From FIG. 1, it will be observed that the inwardly projecting part of cylindrical portion 22 of end bell 8 is the only structure additionally provided to mount the speed reduction means, member 13 and bearing 12 forming part of the rotor assembly. Thus, this embodiment provides an extremely simple construction with a minimum of added parts.

What is claimed is:
1. In an electrical motor, the combination of
 a hollow housing structure having
  a cylindrical side wall,
  annular end walls, and
  a tubular portion spaced inwardly from said side wall and projecting from one of said end walls toward the other of said end walls but terminating short of said other end wall;
 a stator carried by said housing structure;
 a shaft extending through said housing structure,
  said shaft including a portion disposed within said tubular portion of said housing structure,
  said shaft also including another portion projecting outwardly of said housing through said one end wall;
 bearing means mounted between said shaft and said end walls for rotatably supporting said shaft on said housing;
 a hollow rotor structure operatively arranged relative to said stator,
  said shaft extending through said rotor structure,
  said rotor structure being disposed between said other end wall and the adjacent end of said tubular portion of said housing structure,
  said rotor structure comprising a hollow member concentric with said shaft and projecting into said tubular portion of said housing structure;
 means supporting said rotor for rotation about said shaft; and
 speed reduction means operatively associated with the other end of said rotor structure to provide a driving connection between said rotor structure and said shaft, said speed reduction means comprising
  a deformable annular element surrounding said hollow member and provided with a closed series of outwardly facing gear teeth,
  a closed series of inwardly facing gear teeth carried by said tubular portion of said housing structure and surrounding said deformable element,
  a plurality of anti-friction bearing elements disposed between said hollow member and said deformable element, the outer surface of said hollow member being of such shape as to cause said bearing elements to deflect said deformable element radially outwardly at at least two circumferentially spaced points to bring the gear teeth of said deformable element at such points into mesh with the teeth carried by said tubular portion of said housing, the gear teeth of said deformable element being out of engagement with the gear teeth of said tubular portion in areas between said spaced points, and
  a tubular deformable structure surrounding said shaft within said tubular portion of said housing and having one end fixed to said deformable element and the other end fixed to said shaft, said tubular deformable structure being operative to impart rotary movement of said deformable annular element to said shaft.

2. In an electrical motor in accordance with claim 1 and wherein
 said tubular deformable structure comprises a cup-shaped element having
  a cylindrical portion concentric with said shaft and spaced outwardly therefrom, and
  an end wall disposed transversely of said shaft and connected thereto,
 said deformable annular element being integral with the end of said cylindrical portion opposite said end wall.

3. In an electrical motor, the combination of:
 a hollow housing having
  a cylindrical side wall,
  annular end walls, and
  a cylindrical tubular member spaced from said side wall and projecting from one of said end walls toward the other of said end walls but terminating short of said other end wall;
 a stator carried by said housing;
 a shaft extending longitudinally through said housing and having exposed ends projecting beyond said end walls;
 bearing means mounted between said shaft and said end walls for rotatably supporting said shaft on said housing;
 a hollow rotor assembly operatively arranged with respect to said stator and having one end spaced from the adjacent end of said housing, said shaft extending through said rotor assembly;
 means supporting said rotor for rotation about the longitudinal axis of said shaft;
 said rotor assembly including a hollow member projecting toward said adjacent end of said housing and having a tip portion;
 a deformable member surrounding said tip portion of said hollow member and carrying a closed series of gear teeth facing radially outwardly with respect to said shaft;
 an internally toothed gear member surrounding said deformable member and affixed to the inner end of and embraced by said tubular member of said housing,
  the outer surface of said tip portion of said hollow member being of such shape and so connected to said deformable member as to cause said deformable member to be deflected radially outwardly at at least two circumferentially spaced points to bring the gear teeth carried by said deformable member at such points into mesh with the teeth of said gear member, the teeth of said gear member being disengaged from the teeth carried by said deformable member in areas between said spaced points; and deformable means connecting said deformable member to said shaft to rotate said shaft as said deformable member turns as a result of rotation of said hollow member.

4. An electrical motor in accordance with claim 3 and wherein said deformable means is a generally cup-shaped member having a relatively thin-walled portion surrounding said shaft, a wall portion extending transversely of said shaft, and a relatively thick-walled portion embracing said shaft and secured thereto.

5. An electrical motor in accordance with claim 4 and wherein said relatively thick-walled portion is disposed at least predominantly within said relatively thin-walled portion.

6. An electrical motor in accordance with claim 3 and wherein the outer surface of said tip portion of said hollow member includes a bearing race extending elliptically about said shaft, and anti-friction bearing elements are disposed in said race and in pressure-applying contact with said deformable member.

7. In an electrical motor, the combination of a housing;

a stator carried by said housing;

a shaft;

bearing means rotatably supporting said shaft on said housing;

a hollow rotor assembly operatively arranged with respect to said stator, said shaft extending within said rotor assembly;

bearing means supporting said rotor assembly on said shaft for rotation about the longitudinal axis of said shaft, said housing including a cylindrical portion disposed adjacent one end of said rotor assembly and concentric with and spaced outwardly from said shaft;

an internally toothed gear member embraced by said cylindrical portion of said housing and mounted thereby concentric with said shaft and adjacent said rotor assembly, said rotor assembly including a hollow member projecting between said shaft and said gear member;

a deformable member surrounding said hollow member and carrying a closed series of outwardly projecting gear teeth facing the teeth of said gear member, the outer surface of said hollow member being of such shape and so connected with said deformable member as to cause said deformable member to be deflected radially outwardly at at least two circumferentially spaced points to bring the gear teeth carried by said deformable member at such points into mesh with the teeth of said gear member, the teeth of said gear member being disengaged from the teeth carried by said deformable member in areas between said circumferentially spaced points; and hollow deformable means disposed within said cylindrical portion of said housing and connecting said deformable member to said shaft to rotate said shaft as said deformable member is turned by rotation of said hollow member of said rotor assembly.

8. An electrical motor in accordance with claim 7 and wherein said hollow deformable means comprises a generally cup-shaped member having a relatively thin-walled main portion spaced outwardly from said shaft, a relatively thick end wall extending transversely of said shaft, and a relatively thick-walled portion projecting from said end wall inwardly of the housing and embracing and secured to said shaft.

References Cited by the Examiner

UNITED STATES PATENTS

| 1,799,348 | 4/1931 | Apple | 310—83 |
| 2,906,143 | 9/1959 | Musser | 310—83 |

ORIS L. RADER, *Primary Examiner.*

MILTON O. HIRSHFIELD, *Examiner.*